(12) United States Patent
Aichinger-Rosenberger et al.

(10) Patent No.: US 12,429,183 B2
(45) Date of Patent: Sep. 30, 2025

(54) LIGHTING MODULE FOR A VEHICLE

(71) Applicant: Hella GmbH & Co. KGaA, Lippstadt (DE)

(72) Inventors: Michael Aichinger-Rosenberger, Spitz / Donau (AT); Tomas Losak, Breclav (CZ); Rainer Pfingstl, Stegersbach (AT); Raimund Kerschbaummayr, Golling (AT)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/829,817

(22) Filed: Sep. 10, 2024

(65) Prior Publication Data
US 2025/0093005 A1 Mar. 20, 2025

(30) Foreign Application Priority Data
Sep. 19, 2023 (DE) .......................... 102023125282.8

(51) Int. Cl.
| | |
|---|---|
| *B60Q 1/08* | (2006.01) |
| *F21S 41/20* | (2018.01) |
| *F21S 41/25* | (2018.01) |
| *F21S 41/663* | (2018.01) |
| *F21Y 115/10* | (2016.01) |

(52) U.S. Cl.
CPC ............... *F21S 41/25* (2018.01); *B60Q 1/08* (2013.01); *F21S 41/285* (2018.01); *F21S 41/663* (2018.01); *B60Q 2300/112* (2013.01); *B60Q 2300/114* (2013.01); *B60Q 2300/136* (2013.01); *B60Q 2300/42* (2013.01); *F21Y 2115/10* (2016.08)

(58) Field of Classification Search
CPC ...... B60Q 1/0041; B60Q 1/0029; B60Q 1/04; B60Q 1/12; B60Q 2300/42; B60Q 2300/45; B60Q 2300/056
See application file for complete search history.

(56) References Cited

U.S. PATENT DOCUMENTS 8,042,980 B2 * 10/2011 Ookubo ................ F21S 41/635
362/512

FOREIGN PATENT DOCUMENTS

| | | |
|---|---|---|
| DE | 102004019318 A1 | 11/2004 |
| DE | 102004053302 A1 | 10/2005 |
| DE | 102016112617 B3 | 10/2017 |
| DE | 102021132472 A1 | 6/2023 |
| JP | 2014175198 A | 9/2014 |
| WO | 2018172140 A1 | 9/2018 |

* cited by examiner

*Primary Examiner* — William J Carter
(74) *Attorney, Agent, or Firm* — Husch Blackwell LLP

(57) ABSTRACT

A lighting module for use in a lighting device for a vehicle includes at least one projection module for generating a light distribution in the vehicle's environment. At least one light source module is also provided. The projection module contains numerous projection units. The light source module contains numerous light source units. Each projection unit contains at least one projection lens. Each projection unit is dedicated to at least one light source unit. At least two projection lenses from at least two different projection units have different focal lengths.

19 Claims, 3 Drawing Sheets

LIGHTING MODULE FOR A VEHICLE

CROSS REFERENCE

This application claims priority to German Application No. 10 2023 125282.8, filed Sep. 19, 2023, the entirety which is hereby incorporated by reference.

FIELD OF THE INVENTION

The invention relates to a lighting module, a lighting device, a vehicle therewith, a method associated therewith, an associated computer program, a computer-readable storage medium therefor, and a data transmission signal.

BACKGROUND OF THE INVENTION

Vehicles, in particular automobiles, trucks, and motorcycles, normally have at least one lighting device for lighting the vehicle's environment. This can be a headlamp for lighting the area in front of the vehicle. The current invention relates to lighting devices that have one or more light sources, and one or more optical elements for generating a light distribution with the intention of obtaining an optimal illumination for the driver, without blinding oncoming traffic, for example.

Demands placed on the light distribution generated by the lighting device may change, depending on the current situation. By way of example, when cornering, it may be useful to light the inside of the curve to provide the driver with the best overview. The vehicle or lighting device may tilt when decelerating or accelerating, altering the light distribution in relation to the environment. In particular with a motorcycle, higher demands are placed on the light distribution when cornering, due to the tilting of the vehicle.

BRIEF SUMMARY OF THE INVENTION

The object of the present invention is to therefore at least partially overcome at least one of the above problems. In particular, the object of the invention is to create a lighting module, lighting device, vehicle, and method for controlling a lighting module with which an optimized light distribution can be generated, in which the light distribution can be easily adapted to a current driving situation.

This is achieved with a lighting module according to a first aspect of the present invention, a lighting device according to a second aspect, a vehicle according to a third aspect, a method according to a fourth aspect, a computer program according to a fifth aspect, a computer-readable storage medium according to a sixth aspect, and a data transmission signal according to a seventh aspect of the present invention. Other features and details of the invention can be derived from the dependent claims, the description and the drawings. The features and details of the lighting module also apply to the lighting device, vehicle, method, computer program, computer-readable storage medium, and data transmission signal, and vice versa.

In a first aspect of the invention, a lighting module is obtained for use in a lighting device, in particular a headlamp, in a vehicle, in particular a motorcycle, comprising at least one projection module for generating a light distribution in front of a vehicle, at least one light source module, in particular for emitting light into the projection module, which contains numerous light sources, in which each projection unit contains at least one projection lens, and is dedicated to at least one light source unit, and in which at least two projection lens from two different projection units have different focal lengths.

In other words, the lighting module contains at least one projection module and at least one light source module. The projection module is designed to project the light emitted by one or more light sources into at least a portion of the vehicle's environment, thus generating a light distribution therein. If the lighting module is a headlamp, at least part of the light it projects is in front of the vehicle. The projection module contains at least two projection units for this, and the light source module contains at least two light sources, and each projection unit contains at least one projection lens, and is dedicated to at least one light source unit. Furthermore, at least two projection lenses in different projection units have different focal lengths.

The lighting module obtained with the invention has the advantage that it is possible to vary the light distributions that can be generated with the lighting module to a greater extent by using projection lenses with different focal lengths. The different focal lengths result in different diffusions of the light exiting the projection lenses, such that different parts of the vehicle's environment can be lit as needed. A longer focal length makes it possible to more brightly light discrete areas at further distances to the vehicle. With shorter focal lengths, areas closer to the vehicle can be lit with a relatively wide beam. By controlling the individual light source units and/or light sources individually, a wider range of possibilities can be obtained. By way of example, individual light sources can be switched on or off, or dimmed, to obtain a light distribution with the projection module for a specific situation. By using the lighting module obtained with the invention, it is particularly easy to efficiently obtain functions such as an adaptive cornering light, with which the inside of a curve is lit, and/or an adaptive high beam, to avoid blinding oncoming traffic. It is also possible to compensate for losses caused by pitching motions of the vehicle (e.g. when braking) by superimposing a higher light distribution.

Dedicating a light source unit to a projection unit is understood to mean that the light emitted by the light source unit shines substantially into the projection unit to which it is dedicated. The light distribution generated by the lighting module in the present invention is understood to be a cumulative light distribution, obtained by overlapping the partial light distributions generated by the individual projection units.

References to the vertical, lateral, and longitudinal axes of the vehicle relate to the alignment of the lighting module and/or lighting device in the intended position on the vehicle.

A light/dark boundary is understood to be a boundary in the light distribution, above which no light, or substantially no light, is projected.

At least one projection module can contain at least two, preferably at least three, particularly preferably at least four projection units. More than four projection units can also be used. The use of two or more projection units has proven to be particularly advantageous in obtaining a compact structure as well as a more flexible light distribution. At least one light source unit can contain at least one light source. The at least one light source can be a light-emitting diode (LED).

At least one projection unit can contain a projection lens. It can also contain two or more projection lenses. The projection lenses in at least one projection unit can preferably have the same focal length. The use of just one projection lens in at least one projection unit has proven to be preferable. This results in a particularly simple and inexpensive design.

At least one light source unit can contain numerous light sources. In particular, at least two, specifically all, of the light sources in the light source units for the light source module can be controlled independently. This has the advantage that the light beams from individual light sources can be controlled as needed in the projection lenses for the respective light source units. This control can be switching on or off, or dimming, the light source.

At least one of the projection units can have at least one preliminary lens, and the preliminary lens can be positioned in relation to the projection lens such that the preliminary lens focuses light into the focal point of the projection lens. In other words, at least one projection unit can have at least one preliminary lens that is dedicated to at least one projection lens in the projection unit. At least one preliminary lens can be placed in at least one projection unit such that the light emitted from one of the light source units dedicated to the projection unit first passes through the preliminary lens, and then into at least one projection lens. In other words, at least one preliminary lens can be placed at the light-entry side of at least one projection lens. The preliminary lens provides a primary light shaping, and the projection lens provides a secondary light shaping. In at least one projection unit, it is advantageous when at least one projection lens is placed in relation to at least one preliminary lens such that the preliminary lens focuses light into the focal point of the projection lens. This has proven to be advantageous for generating an optimized light distribution with the lighting module. The at least one preliminary lens can comprise at least one lens.

At least one partial light distribution of a projection unit can be generated through the interaction of a preliminary lens, at least one light source, and a projection lens. When numerous preliminary lenses and/or light sources, and/or preliminary lens regions in at least one preliminary lens are used, numerous partial light distributions can be generated with each projection unit. The overall light distribution generated by a lighting module is thus obtained cumulatively from the individual partial light distributions generated by the interaction between the projection units and the corresponding light source units. When numerous preliminary lenses and/or preliminary lens regions, and/or light sources are used, numerous partial light distributions can be generated with each projection lens, such that the light distribution generated by the lighting module can be adapted with greater flexibility to a current driving situation.

At least one of the preliminary lenses can also have at least two different regions with which different light distributions, or partial light distributions, can be generated through the interaction with at least one projection lens in the projection unit, and/or at least one light source in the light source unit dedicated thereto. Each preliminary lens region can be dedicated to at least one light source. In other words, at least one preliminary lens can have at least two regions with different light shaping properties, such that different light distributions can be generated by the different regions, in particular in conjunction with at least one light source and/or projection lens. Numerous preliminary lenses, and/or numerous regions thereof, can interact with a single projection lens. At least one of the preliminary lenses can have at least one first region for generating a fundamental light distribution, and at least one second region for generating a supplementary light distribution. Each of these regions can interact with at least one light source unit or light source, and/or at least one projection lens, to generate a light distribution.

At least one of the projection units can contain at least two preliminary lenses, which are designed to generate at least two different light distributions or partial light distributions, in particular in interacting with at least one projection lens in the projection unit, and/or at least one light source in the light source unit dedicated to the projection unit. There can be at least one first preliminary lens for generating at least one fundamental light distribution, and at least one second preliminary lens for generating at least one supplementary light distribution. Each preliminary lens can interact with at least one light source unit, or light source, and/or at least one projection lens to generate a light distribution.

At least one of the preliminary lenses, ideally each preliminary lens, can be dedicated to at least one projection unit for at least one light source, in particular at least one light source in the light source unit dedicated to the projection unit. Each preliminary lens region in a preliminary lens can also be dedicated to at least one light source.

The projection units can be arranged vertically on the vehicle. The projection unit with the projection lens that has the shortest focal length can be the lowest projection unit. The projection unit that has the projection lens with the longest focal length can be the uppermost projection unit. In particular, the focal lengths of the projection lenses can decrease from the lowest projection unit to the highest. In other words, the focal lengths of the projection lenses in the projection units can decrease from the lowest to the highest. This arrangement of the projection lenses, or projection lens units, with a successive increase or decrease in focal lengths vertically, has proven to be particularly advantageous for generating light distributions optimized to driving situations with a lighting module.

At least one of the projection units can be designed to generate a fundamental light distribution with a light/dark boundary. The light/dark boundary in the fundamental light distribution can advantageously be parallel to the lateral axis of the vehicle. This fundamental light distribution can be generated in particular through the interaction between at least one projection lens, at least one preliminary lens, and at least one light source in the light source unit dedicated to the projection unit. This fundamental light distribution can therefore form a conventional low beam light distribution in front of the vehicle, in particular when travelling in a straight line.

At least one projection unit can be designed to generate a supplementary light distribution with a light/dark boundary, which is pivoted or shifted in relation to the light/dark boundary in the fundamental light distribution. When it is pivoted, the light/dark boundary in the supplementary light distribution is at an angle to the light/dark boundary in the fundamental light distribution. When it is shifted, it can be shifted vertically or laterally. This supplementary light distribution can be generated in particular by the interaction between at least one projection lens, at least one preliminary lens, and/or at least one preliminary lens region, and at least one light source in the light source unit dedicated to the projection unit. Different light sources and/or preliminary lenses, and/or projection lenses and/or preliminary lens regions can be used to generate a fundamental light distribution and a supplementary light distribution, or to generate different supplementary light distributions.

At least one projection unit can be designed to generate, in particular in addition to the fundamental light distribution, numerous supplementary light distributions. The light/dark boundary in at least one of the supplementary light distributions can be at least pivoted in relation to the light/dark boundary in the fundamental light distribution, and the light/dark boundary in at least one supplementary light distribution can be shifted in relation to the light/dark boundary in the fundamental light distribution. When it is just shifted, the light/dark boundary in the supplementary light distribution can still be parallel, or substantially parallel, to the light/dark boundary in the fundamental light distribution.

Consequently, supplementary light distributions can be switched on, or made brighter, for certain driving or environmental situations, in order to obtain an optimal lighting of the environment for the driver of the vehicle.

When the light/dark boundary in a supplementary light distribution is pivoted in relation to the light/dark boundary in the fundamental light distribution, a wedge-shaped partial light distribution (supplementary light distribution) can be generated. This lights the inside of a curve with the lighting module when cornering with a motorcycle as it tilts. This compensates, or even overcompensates, for an otherwise reduced lighting of the inside of the curve as a consequence of the tilting of the motorcycle, resulting in an improved overview for the driver. When a supplementary light distribution is shifted in relation to the fundamental light distribution, in particular without a supplementary pivoting, a change in the fundamental light distribution due to a pitching motion by the vehicle can be compensated for, or even overcompensated for. When the vehicle decelerates, resulting in a downward pitching motion, a partial light distribution can be generated with a light/dark boundary that is higher than the light/dark boundary in the fundamental light distribution, in particular in relation to the vertical axis of the vehicle. A shifting in the opposite direction takes place when the vehicle accelerates, and pitches upward.

The inclination between the light/dark boundary in the fundamental light distribution and that in at least one supplementary light distribution, in particular with a light distribution generated by the projection unit that contains the projection lens with the shortest focal length, is between 19° and 26°, preferably between 23° and 25°, particularly preferably 24°. The inclination between the light/dark boundary of the fundamental light distribution and that of at least one supplementary light distribution, in particular with a light distribution generated by the projection unit that contains the projection lens with the longest focal length, is between 2° and 15°, in particular between 5° and 12°, preferably between 9° and 11°, particularly preferably 10°. Moreover, the inclinations between the light/dark boundary in the fundamental light distribution and that in at least one supplementary light distribution with light distributions generated by projection units in which the focal lengths of the projection lenses increase, decrease successively.

The focal length of the projection lens with the longest focal length can be at least twice that of the projection lens with the shortest focal length. With two vertically adjacent projection units, the focal length of the projection lens with the longest focal length can be a whole number multiple of that of the projection lens with the shorter focal length. This has the advantage that an optimized light distribution can be generated by the light module in numerous driving situations.

It can also be advantageous in the framework of the present invention if the entry surfaces of the projection lenses in at least two projection units are in the same plane.

This advantageously results in a simple and compact design, as well as the generation of an advantageous light distribution.

Furthermore, the light entry surface on at least one, preferably all, of the projection lenses in the light module can be flat, and the light exit surface can be concave. This results in an advantageous light shaping by the projection lenses for an optimized light distribution. This also results in a simple means of adjusting the light distribution generated by the lighting module during assembly in a mass production process by simply moving the projection lenses in relation to the optical axis, such that an optimized tolerance in relation to one another is obtained.

At least one lighting module can contain a printed circuit board in the framework of the invention. In particular, at least one light source module can contain at least one printed circuit board. At least one light source unit, or light source, can be placed on the printed circuit board. This results in a simple and inexpensive design with regard to controlling and supplying electricity to the light source, or light source unit, in question. Conceivably all of the light sources in at least one light source unit, and/or at least one light source module can be placed on the same printed circuit board. This results in a more compact and simple design.

At least one lighting module in the present invention can have at least one control unit with which the lighting module can be at least partially controlled. This means that at least one light source unit, or light source in the light source module in the lighting module, can be controlled by the control unit with regard to switching it on and off, or dimming the light source unit, or light source. At least one lighting device can contain at least one control unit with which at least one lighting module, in particular all lighting modules, in the lighting device can be controlled. At least one control unit can contain data processing means, in particular a processor and/or at least one memory, and/or at least one nonvolatile memory.

At least one light source module in the lighting module obtained with the invention can contain at least one heat sink. The heat sink is used in particular to dissipate heat emitted by the light source units or light sources in the light source module. At least one heat sink can have at least one cooling fin.

All of the light source units in at least one light source module can be placed in the same plane in the present invention. Furthermore, all of the light sources in at least one light source unit, and/or at least one light source module can be placed in the same plane. This results in a simpler design of the lighting module.

The aforementioned object is also achieved in a third aspect of the invention by a vehicle that preferably has at least one lighting device and/or at least one lighting module that are both obtained with the invention. Ideally, the vehicle is a two-wheeled vehicle, in particular a motorcycle. The lighting device can be a lighting device obtained with the invention, in particular according to claim 9, and/or the lighting module is a lighting module obtained with the invention, in particular according to the first aspect of the invention, or according to any of the claims 1 to 8.

The vehicle obtained with the invention in accordance with the third aspect thereof has the same advantages as the lighting module and/or lighting device obtained with the invention, described in accordance with the first and second aspects.

The aforementioned object is also achieved in a fourth aspect of the invention by a method for controlling the lighting module obtained with the invention, in particular a lighting module according to the first aspect of the invention, or any of the claims 1 to 8, in which the method comprises at least one, in particular at least two, or all, of the following steps: switching on and/or switching off, and/or dimming at least one light source in the light source module based on a current deceleration and/or acceleration of the vehicle; switching on and/or switching off, and/or dimming at least one light source in the light source module based on a current tilting of the vehicle; switching on and/or switching off, and/or dimming at least one light source in the light source module based on a current vehicle speed; switching on and/or switching off, and/or dimming at least one light source in the light source module due to oncoming traffic.

This preferably activates (switches on), deactivates (switches off) and/or dims at least one supplementary light distribution generated by the lighting module in addition to the fundamental light distribution by switching on, and/or switching off, and/or dimming at least one light source.

When a vehicle accelerates or decelerates, the vehicle or lighting devices, in particular headlamps on the vehicle, can undergo a pitching motion. This results in an unintended shifting of the light distribution generated by the lighting devices. This can have an at least temporary impact on the driver's field of vision. By switching on additional light sources, the light/dark boundary of the light distribution from a lighting module can be shifted, such that the shifting of the light distribution is at least partially compensated for by the shifting of the light/dark boundary.

When cornering, in particular with a motorcycle, there is an at least temporary change in the position of the lighting device, in particular the headlamp on the vehicle, due to the tilting of the vehicle when cornering. This results in a change in the light distribution generated by the lighting device corresponding to the change in position of the vehicle, resulting in a decrease in the lighting, in particular in the inside of the curve. By switching on, or increasing the brightness, of at least one light source, a wedge-shaped partial light distribution can be generated for lighting the inside of the curve at the edge of the light distribution generated by the lighting device, in order to at least partially compensate for the losses resulting from the tilting of the vehicle.

At high speeds, it is of particular interest to light the environment further ahead of the vehicle than at slower speeds. By controlling the brightness, or switching individual light sources on or off, an optimized light distribution can be generated for specific speeds using the lighting module obtained with the invention.

If there is oncoming traffic, it can be ensured that they will not be blinded by switching off, or dimming, individual light sources, while the rest of the roadway remains lit as much as possible for the vehicle's driver. Once the oncoming traffic has passed, the light sources that were dimmed or shut off can be restored to their normal brightness.

The aforementioned object is also achieved in a fifth aspect of the present invention with a computer program containing commands with which the lighting module obtained with the invention, in particular a lighting module according to the first aspect of the invention, or any of the claims 1 to 8, executes the steps in the method according to the fourth aspect of the present invention, or claim 11. The method can advantageously be at least partially executed by a control unit for the lighting module.

The above object is also achieved in a sixth aspect of the present invention by a computer-readable storage medium on which the computer program obtained with the invention, in particular according to the fifth aspect of the present invention, or claim 12, is stored. The aforementioned object is also achieved in a seventh aspect of the present invention by a data transmission signal with which the computer program, in particular according to the fifth aspect or the present invention, or claim 12, is transmitted.

The computer program, and/or computer-readable storage medium, and/or the data transmission signal obtained with the invention all have the same advantages as the lighting module, and/or lighting device, and/or method obtained with the invention.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

The same reference symbols are used for the same technical features, even in different exemplary embodiments, in all of the drawings.

Figure 1:
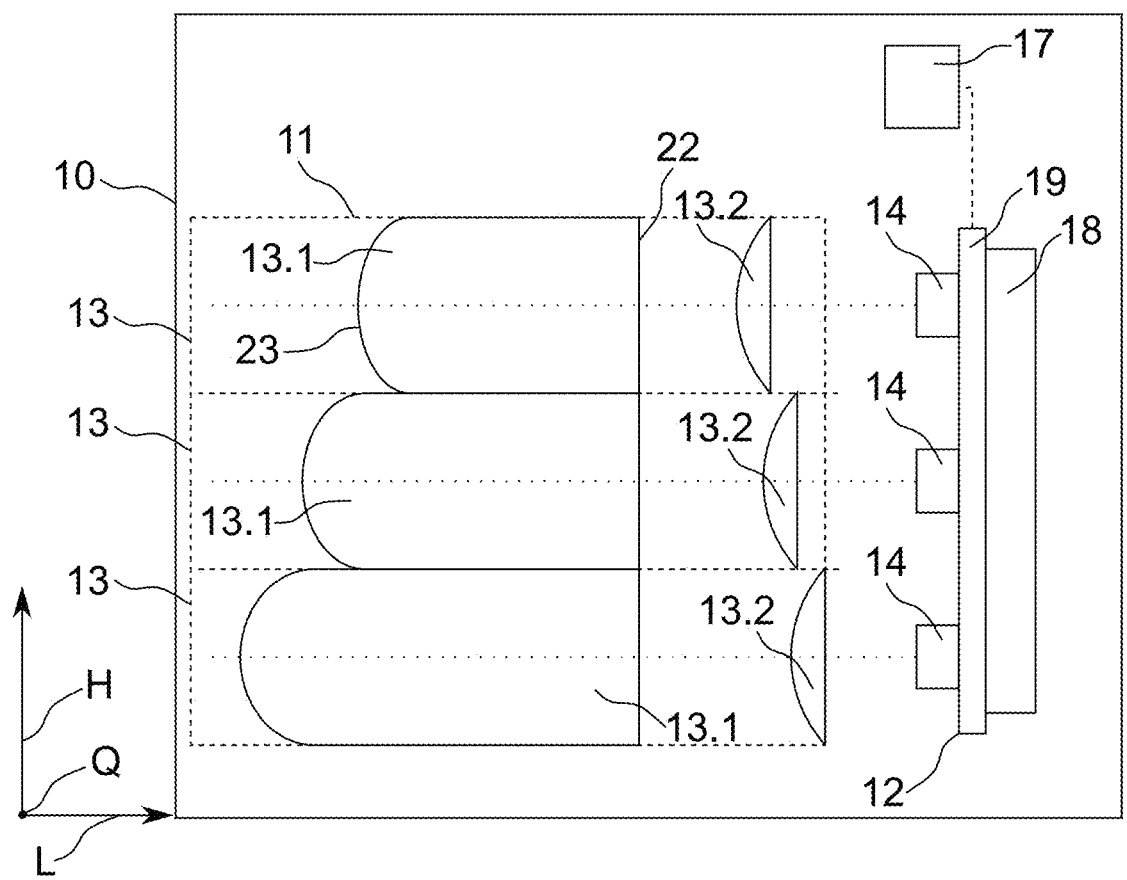
FIG. 1 shows a schematic illustration of a lighting module.

FIG. 1 shows a schematic illustration of a lighting module 10. The lighting module 10 contains at least one projection module 11 for generating a light distribution in the vehicle's 100 environment, and at least one light source module 12. The projection module 11 contains numerous projection units 13, and the light module 12 contains numerous light source units 14, in which each projection unit 13 contains at least one projection lens 13.1, and each projection unit 13 is dedicated to at least one light source unit 14, such that the light emitted by the light source unit 14 is substantially emitted into the projection unit 13 dedicated to the light source unit 14. This is indicated in FIG. 1 by the dotted lines. Furthermore, the projection lenses 13.1 in the projection units 13 each have different focal lengths.

The lighting module 10 obtained with the invention has the advantage that by using numerous projection units 13 with projection lenses 13.1 of different focal lengths, greater variability is obtained in the light distributions generated by the light module 10. The different focal lengths result in different diffusions in the light exiting the projection lenses 13, such that different parts of the vehicle's environment can be adequately lit.

FIG. 1 shows that the projection units 13 are arranged vertically. The lowest projection unit 13 in the projection module 11 contains the projection lenses 13.1 with the longest focal lengths. The uppermost projection unit 13 in the projection module 11 contains the projection lenses 13.1 with the shortest focal lengths. This distribution has the advantage that a particularly advantageous light distribution can be generated by the lighting module 10 that is optimized for numerous driving situations.

FIG. 1 also shows that the surfaces 22 of projection lenses 13.1 in the projection units 13 where light enters are in the same plane. Furthermore, the light entry surfaces 11 of the projection lenses 13.1 are flat, and the light exit surfaces 23 are concave. This results in advantageous light shaping by the projection lenses 13 to obtain an optimized light distribution. The light source units 14 are also in the same plane.

FIG. 1 also shows that the projection units 13 each contain a preliminary lens 13.2, which is placed in relation to the projection lens 13.1 in the projection unit 13 such that the light emitted from the light source unit 14 dedicated to the respective projection unit 13 first passes through the preliminary lens 13.2 and then into the projection lens 13.1. The preliminary lens 13.2 therefore results in a primary light shaping, and a secondary light shaping is obtained with the projection lens 13.1.

Furthermore, the projection lenses 13.1 and preliminary lenses 13.2 in the projection units 13 are placed in relation to one another such that the preliminary lens 13.2 focuses light into the focal point of the projection lens 13.1 to which it is dedicated. This has proven to be advantageous for generating an optimized light distribution with the lighting module 10.

FIG. 1 also shows that the light source module 12 contains at least one printed circuit board 19, which is populated by the light source units 14. This results in a simple and inexpensive design, particularly with regard to controlling, and supplying electricity to, the light source units 14. The light source module 12 also contains at least one heat sink 18 with which heat emitted by the light source units 14 on the printed circuit board 19 is dissipated.

FIG. 1 also shows that the lighting module 10 contains at least one control unit 17, which is configured to control the light source module 12, in particular the light source units 14.

Figure 2:
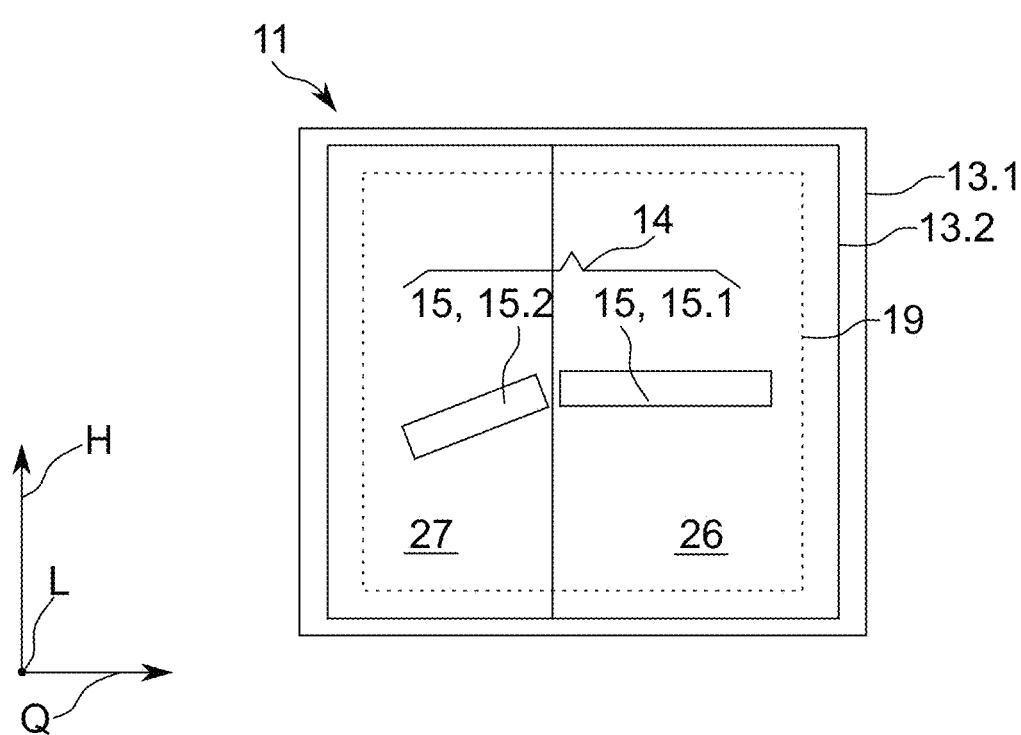
FIG. 2 shows a schematic illustration of a projection unit.

FIG. 2 shows a schematic illustration of a projection unit 11, which is designed to generate at least one fundamental light distribution 24 and one supplementary light distribution 25. The projection unit 11 contains a preliminary lens 13.2 for this that has a first preliminary lens region 26, and a second preliminary lens region 27, with which different light distributions can be generated in conjunction with the projection lenses 13.1 and at least one light source 15. As such, a fundamental light distribution can be generated by the first preliminary lens region 26 in conjunction with the projection lens 13.1 and a first light source 15.1, and a supplementary light distribution can be generated by the second preliminary lens region 27 in conjunction with the projection lens 13.2 and a second light source 15.2.

Figure 3:
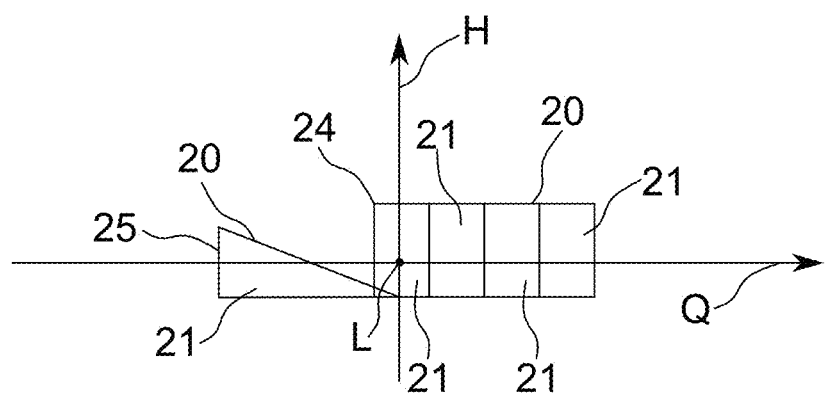
FIG. 3 shows a schematic illustration of a light distribution.

For a better overview, FIG. 3 shows a schematic illustration of a light distribution. This light distribution is exemplary for the projection unit shown in FIG. 2, which contains a projection lens 13.1 with a relatively long focal length. This light distribution is thus generated at a greater distance to the vehicle. It is clear that a fundamental light distribution 24 with a light/dark boundary 20 is generated by the projection unit 11 in conjunction with the light source unit 14. A supplementary light distribution 25 with a light/dark boundary 20 is also generated by the projection unit 11 in conjunction with the light source unit 14, which is at least pivoted in relation to the light/dark boundary 20 in the fundamental light distribution 24.

The light/dark boundary 20 in the fundamental light distribution 24 is parallel, or at least substantially parallel, to the lateral axis Q of the vehicle. The light/dark boundary 20 in the supplementary light distribution 25 is tilted in relation to that in the fundamental light distribution 24. This results in a wedge-shaped partial light distribution, or a wedge-shaped light segment 21. In particular when the lighting module 10 is used in a motorcycle, the inside of a curve is lit by the wedge-shaped light segment 21, or supplementary light distribution 25, when cornering, which causes the motorcycle to tilt.

The different light segments 21 in FIG. 3 are generated by separate light sources 15. By controlling the different light sources independently, the brightnesses of individual light segments 21 in the light distribution can be adjusted, or even entirely dimmed. By way of example, the wedge-shaped light segments 21 can be entirely eliminated when driving in a straight line, and activated when cornering by switching the light source 15 in question on, in order to light the inside of the curve. In other words, at least one supplementary light distribution and/or at least one fundamental light distribution can comprise numerous light segments 21, each of which is generated by a separate light source 15.

Figure 4:
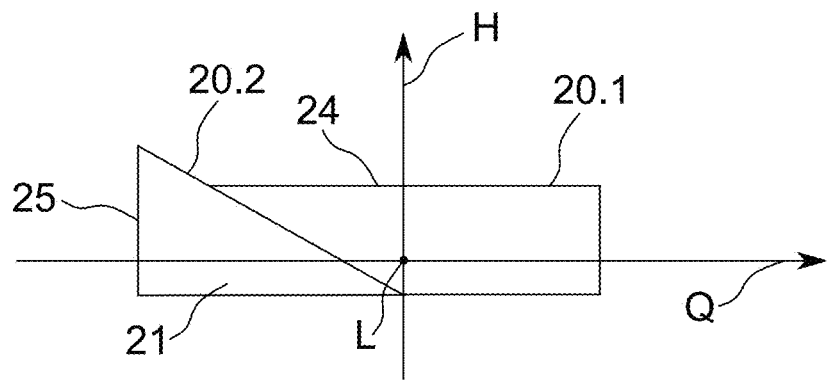
FIG. 4 shows a schematic illustration of a light distribution.

FIG. 4 shows another schematic illustration of a light distribution with a different characteristic from that in FIG. 3. In particular, the inclination between the light/dark boundary 20 in the fundamental light distribution 24 and that in the supplementary light distribution 25 is increased. This light distribution is exemplary for a projection unit 11 containing a projection lens 13.1 with a shorter focal length. This light distribution is generated to light an area closer to the vehicle 100. The light segments 21 therein can also be generated by one or more light sources 15.

Figure 5:
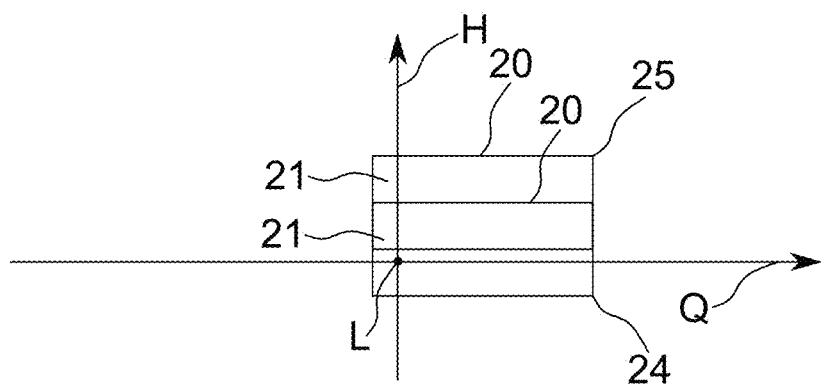
FIG. 5 shows a schematic illustration of a light distribution.

FIG. 5 shows another schematic illustration of a light distribution containing a fundamental light distribution 24 and a supplementary light distribution 25. The light/dark boundary 20 in the fundamental light distribution 24 and that in the supplementary light distribution 25 are parallel, or substantially parallel, and shifted to some extent. In the present example, the supplementary light distribution 25 is shifted upward in relation to the fundamental light distribution 24, such that changes in the light distribution caused by a pitching motion of the vehicle 100 as a result of deceleration are compensated for by the supplementary light distribution 25.

Figure 6:
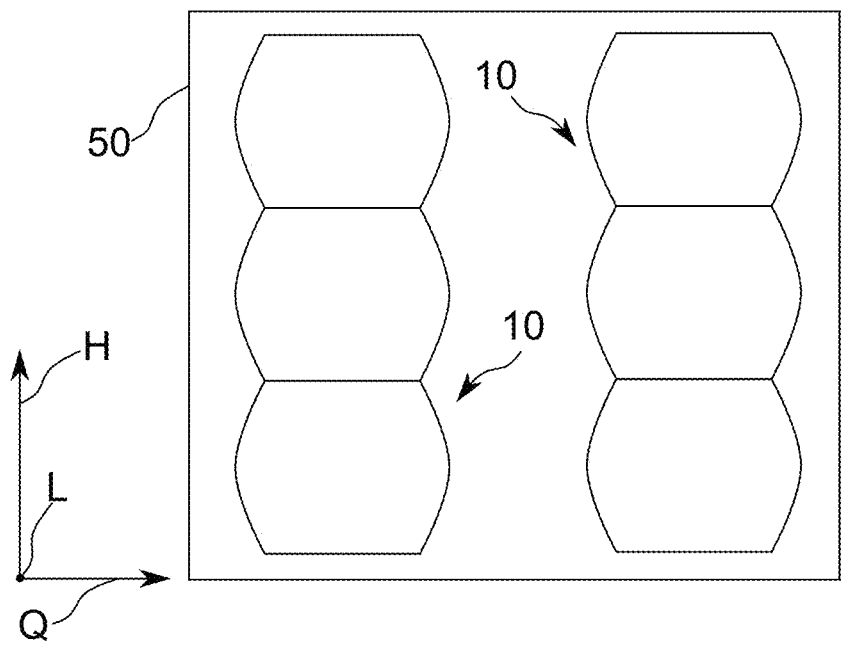
FIG. 6 shows a schematic illustration of a lighting device.

FIG. 6 shows a schematic illustration of a lighting device 50, containing two lighting modules 10. The lighting modules 10 are mirror-symmetrical, such that the field of vision of the vehicle's driver is optimally lit when cornering to the left or right.

Figure 7:
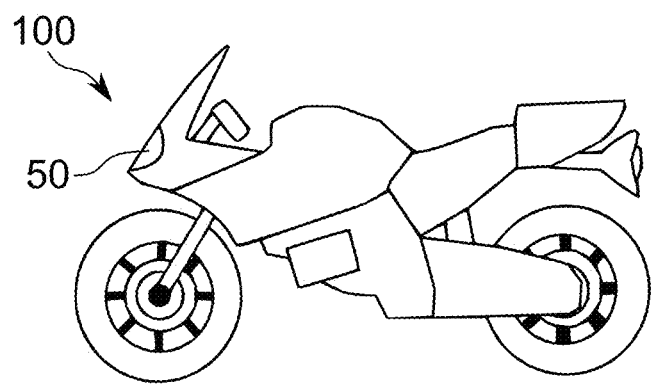
FIG. 7 shows a schematic illustration of a vehicle.

FIG. 7 shows a schematic illustration of a vehicle 100 in the form of a motorcycle, which has at least one lighting device 50 in the form of a headlamp for the vehicle 100.

Figure 8:
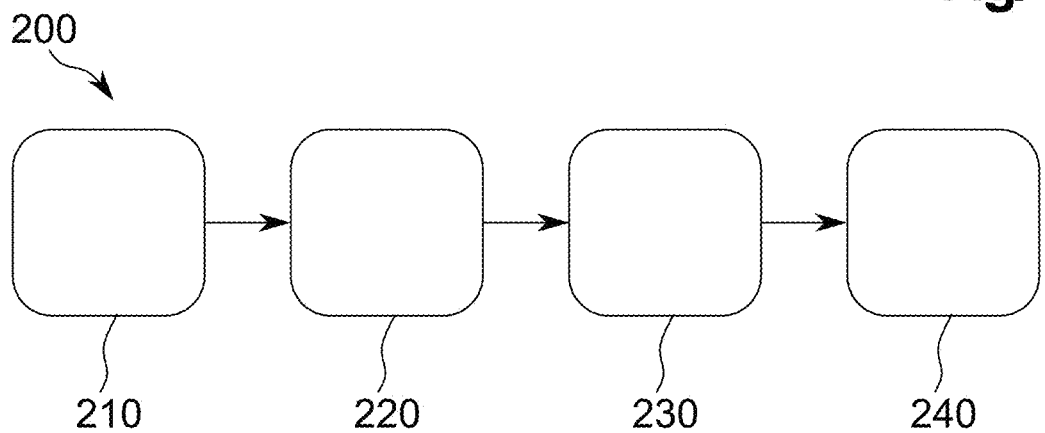
FIG. 8 shows a schematic illustration of a method.

FIG. 8 shows a schematic illustration of a method 200 for controlling a lighting module 10, comprising at least one of the following steps: switching on and/or switching off, and/or dimming 210 at least one light source 15 in the light source module 12 based on a current deceleration of the vehicle 100; switching on and/or switching off, and/or dimming 220 at least one light source 15 in the light source module 12 based on a current tilting of the vehicle 100; switching on and/or switching off, and/or dimming 230 at least one light source 15 in the light source module 12 based on a current vehicle speed; switching on and/or switching off, and/or dimming 240 at least one light source 15 in the light source module due to oncoming traffic.

LIST OF REFERENCE SYMBOLS 10 lighting module
11 projection module
12 light source module 13 projection unit
13.1 projection lens
13.2 preliminary lens
14 light source unit
15 light source
15.1 first light source
15.2 second light source
17 control unit
18 heat sink
19 printed circuit board
20 light/dark boundary
21 light segment
22 light entry surface
23 light exit surface
24 fundamental light distribution
25 supplementary light distribution
26 first preliminary lens region
27 second preliminary lens region
50 lighting device
100 vehicle
200 method
210 switching on/switching off/dimming
220 switching on/switching off/dimming
230 switching on/switching off/dimming
240 switching on/switching off/dimming
H vehicle's vertical axis
Q vehicle's lateral axis
L vehicle's longitudinal axis

The invention claimed is:

1. A lighting module for use in a lighting device for a vehicle, the lighting module comprising:
at least one projection module configured to generate a light distribution in the vehicle's environment, the at least one projection module comprising a plurality of projection units, wherein each projection unit includes at least one projection lens; and
at least one light source module comprising a plurality of light source units,
wherein each projection unit is dedicated to at least one light source unit,
wherein at least two projection lenses from at least two different projection units have different focal lengths; and
wherein the lighting module further comprises a control unit configured to control the plurality of light source units, the control unit being configured to switch on, switch off, and/or dim at least one light source of the light source module based at least on a current tilting of the vehicle.

2. The lighting module according to claim 1, wherein at least one projection unit contains a preliminary lens, wherein the preliminary lens is positioned relative to at least one projection lens of the at least one projection unit such that the preliminary lens focuses light into the focal point of the at least one projection lens.

3. The lighting module according to claim 1, wherein the projection units are arranged vertically, wherein a projection unit with the at least one projection lens that has a longest focal length forms the lowermost projection unit, and/or a projection unit with the at least one projection lens that has a shortest focal length forms the uppermost projection unit.

4. The lighting module according to claim 1, wherein at least one projection unit generates a fundamental light distribution with a light/dark boundary, and generates at least one supplementary light distribution with a light/dark boundary, wherein the light/dark boundary in the supplementary light distribution is pivoted in relation to the light/dark boundary in the fundamental light distribution.

5. The lighting module according to claim 1, wherein at least one projection unit generates a fundamental light distribution with a light/dark boundary and generates at least one supplementary light distribution with a light/dark boundary, wherein the light/dark boundary in the supplementary light distribution is shifted in relation to the light/dark boundary in the fundamental light distribution.

6. The lighting module according to claim 1, wherein a focal length of the projection lens with a longest focal length is at least twice that of the projection lens with a shortest focal length.

7. The lighting module according to claim 1, wherein all the light source units are in the same plane.

8. The lighting module according to claim 1, wherein at least one projection lens has a flat light entry surface, and/or at least one projection lens has a concave light exit surface.

9. A lighting device for a vehicle, the lighting device comprising at least one lighting module according to claim 1.

10. A vehicle comprising at least one lighting device according to claim 9.

11. The lighting module according to claim 1, wherein the control unit is further configured to:
switch on, switch off, and/or dim at least one light source of the light source module based on a current deceleration of the vehicle;
switch on, switch off, and/or dim at least one light source of the light source module based on a current vehicle speed; and
switch on, switch off, and/or dim at least one light source of the light source module due to oncoming traffic.

12. A method for controlling a lighting module for use in a lighting device for a vehicle, the lighting module including at least one projection module configured to generate a light distribution in the vehicle's environment, the at least one projection module including a plurality of projection units, wherein each projection unit includes at least one projection lens, the lighting module also including at least one light source module including a plurality of light source units, wherein each projection unit is dedicated to at least one light source unit, and wherein at least two projection lenses from at least two different projection units have different focal lengths, the method comprising of
switching on and/or switching off, and/or dimming at least one light source of the light source module based on a current deceleration of the vehicle;
switching on and/or switching off, and/or dimming at least one light source of the light source module based on a current tilting of the vehicle;
switching on and/or switching off, and/or dimming at least one light source of the light source module based on a current vehicle speed;
switching on and/or switching off, and/or dimming at least one light source of the light source module due to oncoming traffic.

13. A computer program comprising commands with which a lighting module executes the method according to claim 12.

14. A non-transitory computer-readable storage medium on which the computer program according to claim 13 is stored.

15. A method for controlling a lighting module for use in a lighting device for a vehicle, the lighting module including at least one projection module configured to generate a light distribution in the vehicle's environment, the at least one projection module including a plurality of projection units, wherein each projection unit includes at least one projection lens, the lighting module also including at least one light source module including a plurality of light source units, wherein each projection unit is dedicated to at least one light source unit, and wherein at least two projection lenses from at least two different projection units have different focal lengths, the method comprising at least two of the following steps:

- switching on and/or switching off, and/or dimming at least one light source of the light source module based on a current deceleration of the vehicle;
- switching on and/or switching off, and/or dimming at least one light source of the light source module based on a current tilting of the vehicle;
- switching on and/or switching off, and/or dimming at least one light source of the light source module based on a current vehicle speed;
- switching on and/or switching off, and/or dimming at least one light source of the light source module due to oncoming traffic.

16. The method of claim 15, wherein the method comprises switching on and/or switching off, and/or dimming the at least one light source of the light source module based on the current deceleration of the vehicle.

17. The method of claim 15, wherein the method comprises switching on and/or switching off, and/or dimming the at least one light source of the light source module based on the current tilting of the vehicle.

18. The method of claim 15, wherein the method comprises switching on and/or switching off, and/or dimming the at least one light source of the light source module based on the current vehicle speed.

19. The method of claim 15, wherein the method comprises switching on and/or switching off, and/or dimming the at least one light source of the light source module due to oncoming traffic.

* * * * *